(Model.)
T. JOHNSTON.
LAWN MOWER HANDLE.
No. 271,471. Patented Jan. 30, 1883.
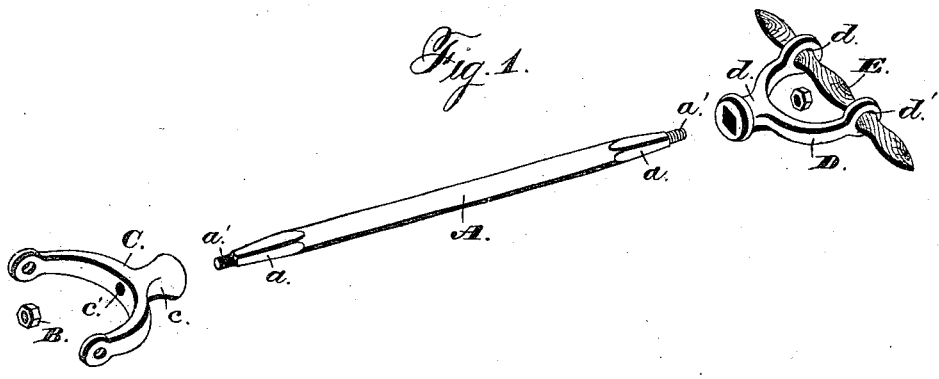
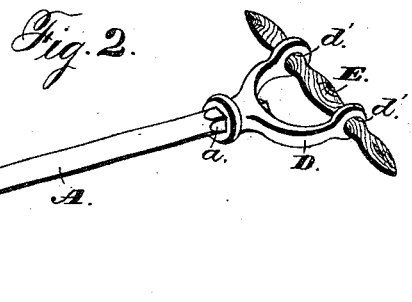
Witnesses:
Jas. E. Hutchinson.
Henry C. Hazard.
Inventor.
Thos. Johnston, by
Geo. S. Prindle, his Atty
N. PETERS, Photo-Lithographer, Washington, D. C.

UNITED STATES PATENT OFFICE.

THOMAS JOHNSTON, OF NEWBURG, NEW YORK, ASSIGNOR TO THE CHADBORN & COLDWELL MANUFACTURING COMPANY, OF SAME PLACE.

LAWN-MOWER HANDLE.

SPECIFICATION forming part of Letters Patent No. 271,471, dated January 30, 1883.

Application filed November 21, 1882. (Model.)

*To all whom it may concern:*

Be it known that I, THOMAS JOHNSTON, of Newburg, in the county of Orange, and in the State of New York, have invented certain new and useful Improvements in Handles for Lawn-Mowers; and I do hereby declare that the following is a full, clear, and exact description thereof, reference being had to the accompanying drawings, making a part of this specification, in which—

Figure 1 is a perspective view of the parts of my handle separated from each other, and Fig. 2 is a like view of the same united.

Letters of like name and kind refer to like parts in each of the figures.

The design of my invention is to increase the strength and efficiency of lawn-mower handles, and to enable the same to be easily taken apart for storage and combined for use; and to this end said invention consists in the construction and combination of the parts of the handle, substantially as and for the purpose hereinafter specified.

In the annexed drawings, A represents the body of my handle, constructed preferably from a round bar of iron, and having at each end a squared tapering section, a, that terminates in a threaded part, a', upon which is placed a nut, B.

Upon the section a, at the lower end of the body A, is fitted a bail-shaped pivotal casting, C, which at its center is provided with a sleeve, c, that is provided with a square tapering axial opening, c', which corresponds to and receives said section a. By means of the nut B, which is placed upon the projecting threaded end a' of said section a, said parts may be firmly united, said nut operating to press said pivotal casting upward upon said tapering part a as far as may be necessary to secure such result.

Upon the upper end of the body A is placed a handle-casting, D, which has the form of the letter U, with a hollow sleeve, d, at its center, and at its ends transverse openings d', through which is driven a wooden bar, E. The opening within the sleeve d corresponds to and fits over the squared tapering end a of the body A, and said sleeve is locked in place, as in case of the sleeve c, by means of a nut, B.

In consequence of the taper of the ends a of the body A, but slight pressure upon the nuts B is necessary in order that the parts of the handle may be firmly united, while by loosening said nuts said parts may be easily and quickly separated when it is necessary to store or pack the handle. Should either of said parts become loosened by use, a slight turn upon its nut will render the same tight and prevent the injury which results from imperfectly-united handles of usual construction.

The square form of the ends of the body A and of the openings in the sleeves c and d hold the latter firmly in circumferential position upon said body and prevent all motion in such direction.

The handle thus constructed possesses largely-increased strength and durability, is far more convenient for storage or transportation, and can be furnished as cheaply as any metal handle heretofore made.

Having thus fully set forth the nature and merits of my invention, what I claim is—

As a new article of manufacture, the hereinbefore-described lawn-mower handle, consisting of the body A, provided with the squared tapering parts a, threaded ends a', and nuts B, in combination with the pivotal casting C, having the sleeve c, and the handle-casting D, provided with the sleeve d, openings d', and bar E, substantially as and for the purpose specified.

In testimony that I claim the foregoing I have hereunto set my hand this 29th day of June, 1882.

THOMAS JOHNSTON.

Witnesses:
LEWIS M. SMITH,
THOMAS COLDWELL.